May 7, 1963  A. N. PINES  3,088,847
AMINOALKYL SILICON COMPOUNDS AS BONDING
AGENTS FOR RESINS TO METALS
Filed May 26, 1959
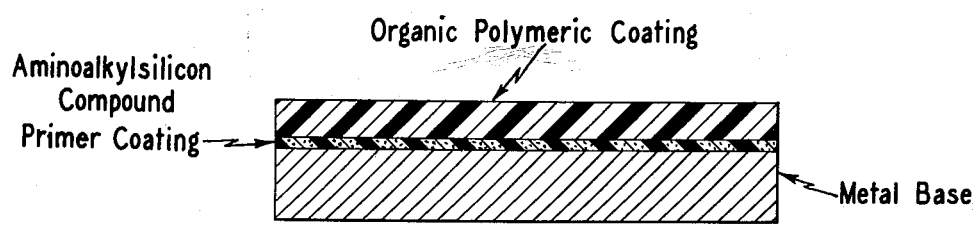
INVENTOR.
ARTHUR N. PINES
BY
ATTORNEY

3,088,847
AMINOALKYL SILICON COMPOUNDS AS BONDING AGENTS FOR RESINS TO METALS
Arthur N. Pines, Snyder, N.Y., assignor to Union Carbide Corporation, a corporation of New York
Filed May 26, 1959, Ser. No. 815,817
37 Claims. (Cl. 117—75)

This invention relates to a new and improved process for applying polymeric materials to metals, particularly for bonding polymeric materials to metals, and to improved composite articles obtained thereby. More particularly, it relates to improving the adherence at high temperatures of polymeric materials, such as an organosilicone electrical insulating varnish, to certain metals by use of an aminoalkyl silicon compound, for example, gamma-aminopropylsilicone, as an undercoating. The new articles produced hereby show superior adhesion of the coating to the metal and improved resistance to corrosion at ambient and elevated temperatures.

The term "polymeric material" as used herein, is intended to include natural resins, such as rubber, varnishes, oils, and waxes, synthetic resins of the thermoplastic type; i.e., polyethylene, fluorocarbons, acrylates, linear polyesters, polyamides, and the like, synthetic resins of the thermosetting type; i.e., epoxides, phenolics, melamines, cross-linked polyesters, and the like, polysiloxanes of the linear and cross-linked varieties which includes silicone rubbers and silicone resins, and synthetic elastomeric products, such as neoprene, GRS butadiene-styrene copolymers, chloroprene, and mixtures thereof.

In the use of polymeric coatings on metals whereby the coating is used to decorate and/or prevent corrosion on the metal, undercoatings are commonly employed to reinforce or mount the coating. Usually prime coats or bonding agents are required to obtain or improve a bonding between the metal substrate and the coating. The conventional prime coats and "stickums" heretofore used for preparing metal surfaces for coatings have been as far as it is known organic or organic pigmented materials. However, there are many applications in which known bonding materials have been far from satisfactory and, indeed, many coatings cannot be applied because such materials provide no bond at all between coating materials and metals. For example, there is no known way of bonding organosilicone resins to copper metal to provide a composite article which will be resistant to high temperature oxidation.

It has been found that adherence between polymeric materials and metals can, in general, be improved by treating the surface of the metal with an aminoalkyl silicon compound to provide a thin film or undercoating thereon before bonding such a material to the metal. The aminoalkyl silicon compound may be applied either as a monomer or as a polymer, and it serves both as a bonding agent between the metal and the overcoating and as a corrosion barrier which resists high temperature oxidation and underfilm corrosion due, for example, to high humidity. This not only provides increased protection to the base metal but also maintains the integrity of the coating on the metal. The undercoatings are normally transparent and do not have an adverse effect on the appearance of the metal or of the composite article.

Moreover, the process of the present invention not only provides high temperature resistant bonds between these polymeric materials and metals but also provides superior bonds at lower temperatures between many of these materials and metals. For example, aluminum metal treated with a prime coat of gamma-aminopropyl-phenylsilicone copolymer gives, upon curing with silicone elastomer compound, a superior bonding of this metal to silicone rubber.

Bonds have been formed between a large number of the above listed polymeric materials with a representative number of metal substrates by applying a thin film of aminoalkyl silicone compound as prime coating for the metal. This silicone prime coat provides improved adhesion of the overcoated material to the metal substrate to provide composite articles which are resistant to high temperature degradation; for example, between silicone rubber to many metals, between neoprene rubber to lead, between polyvinyl chloride to steel, between acrylate resins to several metals, and between epoxy resins systems to steel. Moreover, it has been found that the strength of such bonds between, for example, silicone rubber to many metals, polyvinyl chloride copolymers and terpolymers to several metals, and silicone varnishes to copper and steel, is not materially impaired upon exposure to high temperature and that composite systems are resistant to underfilm corrosion due to high humidity.

The single FIGURE is a sectional view of a portion of an assembly comprising a metal base, an aminoalkylsilicon compound as a primer coating and an organic polymeric coating. The organic polymeric coating is bonded to the metal by the aminoalkylsilicon compound.

Suitable for use in our process are the aminoalkylalkoxysilanes and the aminoalkylpolysiloxanes, including copolymeric materials which contain both aminoalkylsiloxane units and hydrocarbylsiloxane units. Each of these materials contains the group:

$$(>N-R-Si\equiv)$$

wherein R is a divalent saturated aliphatic or saturated or unsaturated cyclic hydrocarbon radical having a chain of at least three carbons and wherein nitrogen is attached to at least a third carbon removed from silicon, wherein each of the free bonds of the nitrogen atom is bonded to a member from the class consisting of hydrogen, hydrocarbyl, aminoalkyl and [—(CH$_2$)$_a$Si≡], wherein ($a$) is an integer having a value of at least 3 and wherein at least one free bond of silicon is attached to a group from the class of alkyl and silicon through Si—O bonds and the remaining free bonds of silicon are attached to hydrocarbyl. Hydrocarbyl is intended to mean a monovalent group composed of carbon and hydrogen. Typical of the aminoalkylalkylalkoxysilanes which may be employed for our undercoating are those compounds represented by the structural formula:

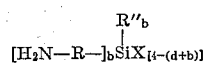

$$R''_b$$
$$[H_2N-R-]_b\overset{|}{S}iX_{[4-(d+b)]}$$

wherein R'' represents an alkyl group such as methyl, ethyl propyl, and butyl, and the like, or an aryl group such as phenyl, naphthyl and tolyl and the like, X represents an alkoxy group such as methoxy, ethoxy, and propoxy groups and the like, R is a divalent radical as described above, and preferably having a carbon chain of from 3 to 4 carbons, ($b$) is an integer having a value of from 0 to 2 and preferably a value of from 0 to 1, ($d$) is an integer having a value of from 1 to 2, and the sum of ($d+b$) is not greater than 3. Illustrative of such aminoalkylalkoxysilanes are gamma-aminopropyltriethoxysilane, gamma-aminopropyltripropoxysilane, gamma-aminopropylmethyldiethoxysilane, gamma-aminopropylethyldiethoxysilane, gamma - aminopropylphenyldiethoxysilane, delta - aminobutyltriethoxysilane, delta-aminobutylmethyldiethoxysilane, delta-aminobutylethyldiethoxysilane, delta - aminobutylphenyldiethoxysilane, gamma-aminobutyltriethoxysilane, gamma-aminobutylmethyldiethoxysilane, and the like. The aminoalkylalkoxysilanes are disclosed and claimed as new compositions of matter in copending U.S. applications Serial Nos. 483,421, now U.S. Patent No. 2,832,754, and 615,466, now U.S. Patent 2,930,809, filed January 21, 1955, and October 12, 1956, respectively. Processes for producing these compounds are also disclosed and claimed in said copending applications.

Typical of the aminoalkylpolysiloxanes which may be used for our undercoating are those polysiloxanes which contain the structural unit:

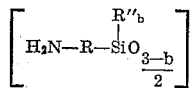

wherein R", R and (b) have the same values described above. Such polysiloxanes are prepared by the hydrolysis and condensation of those aminoalkylalkoxysilanes decribed above or by the cohydrolysis and cocondensation of such aminoalkylalkoxysilanes with other hydroyzable silanes and can include aminoalkylpolysiloxanes of the trifunctional variety (i.e. where $b=0$), aminoalkylalkylpolysiloxanes and aminoalkylarylpolysiloxanes of the difunctional variety which include cyclic or linear polysiloxanes (i.e. where $b=1$) and linear aminoalkyldialkyldisiloxanes, aminalkyldiaryldisiloxanes and aminoakylalkylaryldisiloxanes of the monofunctional variety (i.e. where $b=2$) as well as the mixture of compounds produced by the cohydrolysis of difunctional, trifunctional and monofunctional aminoalkylsilanes.

Suitable aminoalkylpolysiloxanes of the trifunctional variety can be more specifically depicted as containing the structural unit:

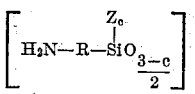

wherein R has the value previously described, Z represents an hydroxyl and/or alkoxy group, and (c) has an average value of from 0 to 1 and can be as high as 2 but preferably from 0.1 to 1. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes in which Z represents predominantly silicon-bonded alkoxy groups can be prepared by the partial hydrolysis and complete condensation of the same starting silane. On the other hand, aminoalkylpolysiloxanes in which Z represents predominantly silicon-bonded hydroxyl groups can be prepared by the essentially complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzate so formed to produce the desired polymer.

Suitable aminoalkylpolysiloxanes of the difunctional variety which include cyclic and linear polysiloxanes can be more specifically depicted by the structural formula:

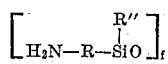

wherein R" and R, have the values previously described and (f) is an integer having a value of at least 3 and can be as high as 7 for the cyclic aminoalkylpolysiloxanes and higher for the linear aminoalkylpolysiloxanes. Such cyclic and linear aminoalkylpolysiloxanes can be prepared by the hydrolysis and condensation of aminoalkylalkyldialkoxysilanes or aminoalkylaryldialkoxysilanes. In carrying out the hydrolysis and condensation procedures there is produced a product comprising a mixture of cyclic and linear polysiloxanes from which the desired polysiloxane can be recovered. Illustrative of the cyclic aminoalkylsiloxanes suitable for use in our undercoating process are the cyclic tetramer of gamma-aminopropylmethylsiloxane, the cyclic tetramer of delta-aminobutylphenylsiloxane and the like. Illustrative of linear aminoalkylpolysiloxanes suitable for use in our coating process are gamma-aminopropylmethylpolysiloxane, gamma-aminopropylethylpolysiloxane, delta-aminobutylmethylpolysiloxane, gamma-aminobutylmethylpolysiloxane and the like.

Included among the linear aminoalkylpolysiloxanes which may be employed in our process are the alkyl, alkoxy and hydroxyl end-blocked polysiloxanes which contain from 1 to 3 of such groups bonded to the terminal silicon atoms of the molecules comprising the polymeric chains. Thus, we can also employ as our starting aminoalkyl silicon compound, such linear end-blocked aminoalkylpolysiloxanes as monoethoxy end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkylpolysiloxanes and aminoalkylarylpolysiloxanes useful in our process can be prepared by the equilibration of cyclic aminoalkylsiloxanes with silicon compounds containing predominantly silicon-bonded alkoxy groups, or by the cohydrolysis and condensation of trialkylalkoxysilanes with aminoalkylalkyldiethoxysilanes or aminoalkylaryldiethoxysilanes. Hydroxyl end-blocked linear polysiloxanes can also be prepared by heating linear or cyclic aminoalkylpolysiloxanes with water.

The copolymeric aminoalkylpolysiloxanes which can be employed in our process can be depicted as containing both the structural units:

and

wherein R", R, and (b) have the values described above, R''' represents an alkyl group, such as methyl, ethyl, propyl, and butyl, and the like, or an aryl group such as phenyl, naphthyl, and tolyl, and the like, or an olefinic group such as vinyl and cyclohexenyl and the like, and (e) is an integer having a value of from 0 to 2. The copolymers suitable for use in our process can contain various combined siloxane units such as trifunctional aminoalkylsiloxane units (where $b=0$) with trifunctional alkyl-, aryl-, olefinic- or mixed alkyl-, olefinic- and arylsiloxane units (where $e=0$) or with difunctional alkyl-, aryl-, olefinic- or mixed alkyl-, olefinic- and arylsiloxane units (where $e=1$). These copolymers can also contain various combined siloxane units; difunctional aminoalkylsiloxane units (where $b=1$) with trifunctional alkyl-, aryl-, olefinic- or mixed alkyl-, olefinic- and arylsiloxane units (where $e=0$) or with difunctional alkyl-, aryl-, olefinic- and arylsiloxane units (where $e=1$).

These copolymers which contain trifunctional aminoalkylsiloxane units and other siloxane units are preferably prepared by the cohydrolysis and cocondensation of the corresponding alkoxysilane starting materials. Such copolymers can contain silicon-bonded alkoxy and/or hydroxyl groups or they can comprise essentially completely condensed materials. The linear and cyclic copolymeric siloxanes can be prepared by the method just described or by the separate hydrolysis and condensation of an aminoalkylalkyldialkoxysilane or aminoalkylaryldialkoxysilane and the dialkyldialkoxysilane, diolefinicdialkoxysilane, mono-alkyl-mono-olefinic-dialkoxysilane, mono-aryl-mono-olefinic-dialkoxysilane, or diaryldialkoxysilane to cyclic aminoalkylsiloxanes and cyclic dialkylsiloxanes, diolefinic siloxanes, mono-alkyl-mono-olefinic-siloxanes, mono-aryl-mono-olefinic-siloxanes or diarylsiloxanes and subsequently eqilibrating mixtures of such cyclic siloxanes to linear copolymers. Such linear copolymers can also contain chain-terminating or end-blocking groups such as alkyl, alkoxy, or hydroxyl groups.

While the primary aminoalkyl silicon compounds have been described in detail and are preferred in the treatment of metals to aid in the bonding of polymeric materials thereto, the corresponding secondary and tertiary aminoalkyl silicon compounds, i.e., those in which one or both of the hydrogen atoms bonded to nitrogen of the generically and specifically depicted primary aminoalkyl silicon compounds is replaced by a hydrocarbon, or aminoalkyl group, can, as hereinbefore disclosed, be employed with good results.

Secondary and/or tertiary aminoalkyl silicon compounds containing the unit:

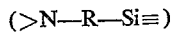

in which the nitrogen atom thereof is bonded to an aminoalkyl group are known as N-aminoalkyl-aminoalkyl silicon compounds and are employed in their monomeric form, as, for example, a substituted alkoxysilane, or in their polymeric form as well as in the form of a copolymer containing hydrocarbon-substituted siloxane units. As is obvious, such N-aminoalkyl-substituted aminoalkyl silicon compounds when in their polymeric or copolymeric form comprise for example, oils or resins of the type described above.

The aminoalkyl substituents, which are bonded to the nitrogen atom of aminoalkyl silicon compounds to form products useful in the present invention, contain at least one nitrogen atom which can be either primary, secondary or tertiary, and include such groups as beta-aminoethyl, gamma-aminopropyl, gamma-aminoisobutyl, omega-aminohexyl, N-gamma-aminopropyl - gamma - aminopropyl and the like. Typical of such N-aminoalkyl-aminoalkyl silicon compounds are:

N-gamma-aminopropyl-gamma-aminopropylmethyldiethoxysilane,
N-beta-aminoethyl-gamma-aminopropyltrimethoxysilane,
N-beta-aminoethyl-gamma-aminoisobutyltriethoxysilane,
N-gamma-aminopropyl-delta-aminobutylmethyldiethoxysilane, and the like as well as the polymers prepared by the hydrolysis and consideration thereof either alone or with other hydrolyzable silanes.

N-aminoalkyl-aminoalkyl silicon compounds are prepared by the reaction of diamines such as ethylene or propylene diamine with chloroalkyl silicon compounds.

The metals to which polmeric materials can be bonded by treating with the above listed aminoalkyl silicon compounds are those metals in the electromotive series which lie below and include magnesium. Alloys of these metals similarly have their bond strength to resins improved by this process. The metals and alloys tested include aluminum, brass, copper, steel, stainless steel, magnesium, nickel, lead, silver terne plate (tin plate), tin, titanium, and zinc.

In the practice of this invention, metal articles are treated, prior to the application of the polymeric material, by the application of a continuous thin film of an aminoalkyl silicon compound over the surface of the metal which may thereafter be cured prior to overcoating to form a bonding prime coat on the surface of the metal. The method by which an aminoalkyl silicon compound is applied to a metal is not critical and any method can be employed that results in the deposition of a continuous film, for example, by painting, dipping, flood coating, spraying or wiping. Coatings may be applied employing solvent solution, dispersions in liquids systems, or by using undiluted aminoalkyl silicon materials. Coatings have also been made by spray application from aerosol bombs. The preferred methods are applying the coating from aqueous solutions, where there is solubility and from polar organic solvent solutions such as alcohol and ether solvent systems. Illustratively, solvent solutions which can be used include methanol, ethanol, propanol, isopropanol, butanol, 2-ethyl-hexanol, monomethylether of ethylene glycol, methylene chloride, trichloroethylene, mixed solvent systems such as toluene-monomethylether of ethylene glycol, alcohols and ethers, such as di-isopropylether, and alcohols and freon-type propellants such as perchloroperfluoromethanes and ethanes.

The systems used for applying the undercoating can contain varying amounts of the aminoalkyl silicon compound. We have employed, with good results, systems containing from 4.0–30.0 percent by weight. We can employ systems containing greater or lesser amounts of the aminoalkyl silicon compound. The concentration employed is largely a matter of cost and convenience.

After dipping or spraying of the aminoalkyl silicon compound on the metal, the coating can be cured by heating to temperatures of from 50–150° C. and above or by simply allowing the coated metal to stand. By curing of this "prime coating," as used in this disclosure, is meant the fixing, bonding, or complexing of the coating to the surface.

After the undercoating or prime coat of the aminoalkyl silicon compound has been applied to the metal, the metal can be treated with a polymeric material in a conventional manner, that is in the usual manner in which such materials are normally applied to surfaces to be treated. It should be understood, however, that it is not necessary in all cases, to cure the undercoating prior to the application of the overcoating. For example, the aminoalkyl silicon compound can be force dried or air dried prior to the application of a polymeric material. And in cases in which the overcoating is itself cured at high temperature, such as when the metal is covered with a silicone elastomer, it is unnecessary to cure the aminoalkyl silicon compound prior to the application of the elastomer. However, in cases in which the overcoating contains materials such as solvents which would dissolve the undercoating, it would be necessary to first cure the aminoalkyl silicon compound before the overcoating is applied.

The thickness of the underfilm applied is not narrowly critical and may vary from very small thicknesses to relatively large ones. Film thicknesses ranging from 0.01 to 0.10 mil are preferred although from an economic point of view, small film thicknesses, as small as 0.005 mil, can be employed. The thickness of the undercoating may be regulated by the application; i.e. the concentration of the solvent solution and the number of applications can be varied to regulate thickness. Even relatively thick films can be obtained by multiple application from dilute solutions.

The improved properties of our composite materials were found by the following evaluation tests. Both metal strips or panels and wires were used as expiremental specimens. In all tests the metal surfaces were cleaned by scouring with an alkaline cleanser, such as "Old Dutch Cleanser," were washed with water, and were then dried. The aminoalkyl silicon compounds were applied from alcohol solution and cured.

Aminoalkyl silicone primed metal strips which had been heat cured and unprimed metal strips were placed on elastomer compound. The compound was then cured in the presence of heat, catalyst, with or without pressure. The composite articles were then examined for bonding. In addition to metal strips, bronze wire, steel and aluminum rolls, and silver plated bus-bar fittings and titanium discs have been bonded to silicone elastomers.

The effectiveness of an aminoalkyl silicone as a prime coat for bonding organic resin systems to metal was determined by visually observing the improvements in bonding of the resin coating on the composite article formed when the article was subjected to the following tests: (a) measurement of peel strength, (b) improvement in bond strength at elevated temperatures, and (c) improvement in bond strength and corrosion resistance at high humidity.

The following examples are illustrative of this invention:

EXAMPLE I

This example shows improved bond strength at elevated temperatures. Gamma-aminopropylsilicone was prepared by charging 220 g. gamma-aminopropyltriethoxysilane and 130 g. anhydrous alcohol to a 1000 ml. flask equipped with stirrer, reflux condenser, thermometer, and separatory funnel. In a period of 15–20 minutes, 50 grams of water was added with stirring. The contents was heated to reflux for one-half hour. One pint of water-white solution was obtained. One part of this resin solution was diluted with five parts by weight of anhydrous alcohol to give the silicone treating solution.

For the preparation and treatment of the metal specimen, a 1½ x 6-inch copper strip was scoured with an alkaline cleanser. It was then flushed with water and dried. A portion of this metal strip was then immersed in the silicone treating solution, removed, and allowed to drain and air dry. The air dried copper panel was then completely immersed in a methyl-phenyl silicone electrical insulating varnish (50 percent solids in toluene) which was comprised of 1.50 organic radicals per silicon atom and 0.45 phenyl unit per methyl unit. The coated panel was allowed to stand in air 2 hours until the solvent had evaporated. This panel was then cured 2 hours at 150° and 16 hours at 200° C.

This copper panel was then tested by placing it in a 275° C. air circulating oven for 100 hours. After this time it was removed. Where the strip had been aminoalkyl silicone treated, the copper surface was bright and shiny and there was excellent adhesion of the organosilicone coating to the metal. Where the copper strip did not receive the aminoalkylsilicone compound, the copper metal was completely darkened. Also the resin coating over the unprimed copper surface had essentially lost all its bond since it completely peeled away from the copper metal.

Bonding Agent for Rubber to Metal (1) *Silicone Rubber.*—The following type of silicone elastomer compounds have been successfully bonded to metal by the method of this invention:

(a) Silicone elastomer [1] compound at 100 percent solids
(b) Silicone elastomer [1] solution at 27 percent solids Elastomer compounds from type (a) have been cured by mold (press) curing and oven curing in the absence of pressure. Elastomer compounds from type (b) have been cured only by oven curing. Excellent metal to silicone rubber bonds have been established. Most test work was done with the silicone elastomer of type (a).[1]

EXAMPLE II

A 1½ x 6-inch copper strip was cleaned by momentarily dipping in 18 percent HCl solution, rinsing with water, then scouring with an alkaline cleanser. After washing, the strip was immersed in acetone and allowed to air dry. About 4 inches of the panel was brush-coated with 5 percent gamma-aminopropylsilicone-phenylsilicone copolymer in ethanol. This coating was allowed to air dry for about 30 minutes. Silicone elastomer compound as described above was obtained and sheeted it off a 2 roll mill. This elastomer was then placed over the entire copper panel. This was then press cured at 50 lb. pressure for 15 minutes at 350° F.

When the elastomer compound was removed from the press it was observed that: (1) curing converted the compound to a good elastomer, (2) where there was no aminoalkyl silicone prime coating on copper there was no elastomer adhesion to copper, and (3) where there was aminoalkyl silicone prime coating on copper, there was excellent adhesion to copper. The copper panel silicone rubber was then post-cured for 16 hours at 480° F. It was observed that the silicone rubber was still strongly bonded to the copper panel.

The silicone elastomer compound has the following physical properties: mold cure tensile 900 p.s.i., elongation, 300 percent. When the elastomer compound was torn from both the mold cured and the post-cured copper panel, the rubber did not peel away from the metal. Rather, it was observed that the rubber sheared in such a manner as to leave a layer of elastomer strongly bonded to the metal. This example proves conclusively that the aminoalkyl silicone coating has functioned as a bonding agent for the silicone rubber to copper metal. The example also shows that the bond is stable over a wide range of temperatures and that the metal-rubber bond is stronger than the tear strength of the rubber.

In addition to the bonding of silicone rubber to copper, silicone rubber has been bonded to various other metals with various aminoalkyl silicon compounds using the same test procedures as described above. The results of these tests are listed in Table I below. Best bonds were obtained using the copolymers as bonding agents. Generally it is best to heat cure the prime coat on the metal before application of the rubber.

[1] 100 parts of a high molecular weight dimethyl silicone gum-stock modified by 0.35% by weight of a vinyl-ethylsilicone, 40 parts of a silica, catalyzed by 1 part of benzoyl peroxide catalyst dispersed in 1 part dimethyl oil.

TABLE I—AMINOALKYL SILICONE COMPOUNDS AS BONDING AGENTS FOR SILICONE RUBBER [a] TO METALS

| Silicone compound used as metal coating | Cu | Al | Stainless steel | Cold rolled steel | Pb | Sn | Mg | Ag | Ni | Ti |
|---|---|---|---|---|---|---|---|---|---|---|
| Monomers: $NH_2(CH_2)_3Si(OEt)_3$ | x | | | | | | | | | |
| Polymers: | | | | | | | | | | |
| $NH_2(CH_2)_3SiO_{3/2}$ | x | | | | | | | | | |
| $NH_2(CH_2)_4SiO_{3/2}$ | x | x | | | x | x | x | | x | |
| Copolymers: | | | | | | | | | | |
| $\phi SiO_{3/2} \cdot NH_2(CH_2)_3SiO_{3/2}$ | x | x | x | x | x | x | x | x | x | x |
| $\phi SiO_{3/2} \cdot NH_2(CH_2)_4SiO_{3/2}$ | x | x | | | x | x | x | x | x | |
| $\phi SiO_{3/2} \cdot NH_2(CH_2)_4SiMeO$ | x | | | | | | | | | |
| $ViSiO_{3/2} \cdot NH_2(CH_2)_3SiO_{3/2}$ [b] | x | | | x | | | | | | |

NOTE.—x—Tested and found to function as bonding agent for silicone rubber to metal.

[a] As described above.

[b] The copolymer of gamma-aminopropylsilicone and vinylsilicone was prepared by charging to a 1 liter 3-neck round-bottom flask equipped with reflux condenser, agitator, thermometer, and dropping funnel: 95 grams vinyltriethoxysilane, 110 grams gamma-aminopropyltriethoxysilane, 130 grams anhydrous ethanol. The mixture was slurried and over a period of 20 minutes, 50 grams of water were added. The solution was then heated to reflux at 80° C. and maintained at this temperature for 45 minutes. The following lists the properties for the product:

| Analysis | Theoretical | Found |
|---|---|---|
| Percent solids | 24.6 | 25.3 |
| Percent silicon | 7.3 | 7.5 |
| Percent $NH_2$ | 2.08 | 1.98 |
| Bromine number | 20.6 | 20.0 |

EXAMPLE III (2) *Neoprene rubber.*—Two strips of lead foil of about 1½ x 4 inches were cleaned by scouring with steel work. These metal strips were then dipped in acetone and then air dried. These strips were then partially immersed respectively in the following 5 percent aminoalkyl silicone solutions in ethanol: (a) Copolymer of delta-aminobutylsilicone with phenylsilicone, and (b) copolymer of gamma-aminopropylsilicone with phenylsilicone. These strips were then cured by heating them 5 minutes at 150° C.

Some neoprene rubber compound was prepared by mixing on a differential 2-roll mill 200 g. neoprene-W and 60 g. Superfloss. Six (6) grams of ditertiary butyl peroxide catalyst were added to this elastomer compound, and the neoprene elastomer compound was then sheeted off. The aminoalkyl silicone treated lead strips were then placed in a 6 x 6-inch mold and were covered with the neoprene compound and press cured one-half hour at 310° F. under pressure. After removal of the mold from the press, and when the samples had returned to room temperature, it was observed that: (a) the neoprene elastomer compound had cured to a good rubber, (b) on that portion of the lead which was not coated with the aminoalkyl silicone compound, there was no adhesion of the rubber to the metal, and (c) for the portions of the lead strips coated with both silicone copolymers, there was good adhesion of the rubber to the lead. This example conclusively proves that neoprene rubber will not bond to untreated lead foil. However, when the lead surface is prime coated with an aminoalkyl silicone copolymer a positive bond between the metal and rubber is established.

*Undercoats for Resin Systems*

(1) *"Vinylite".*—Polyvinylchloride homopolymer has no adhesive strength to steel. "Vinylite" copolymers and terpolymers when applied as coatings to steel, brass, zinc, and tin plate substrates usually turn black after about 15–20 minutes at 150° C. This color change is also accompanied by loss in adhesion of the resin to the metal and embrittlement of the resin coating. By priming a copper panel with an aminoalkyl silicone of this invention, the "Vinylite" copolymer overcoat shows adhesion to the metal after 50 hours as 150° C.

EXAMPLE IV

*"Vinylite" Copolymer (VYHH) on Steel*

Two 1½ x 6-inch mild steel panels were scoured with an alkaline cleanser and then washed and dried. One panel was then dip-coated in 5 percent gamma-aminopropylsilicone in ethanol and placed in a 150° C. oven for 5 minutes. A 20 percent "Vinylite" resin solution was prepared in the following manner. One part of VYHH (a commercially available copolymer comprised of 87 percent vinylchloride and 13 percent vinylacetate), 2 parts toluene and 2 parts methylisobutylketone were added together and mixed on a jar rolling mill until it was completely solvated. Both the aminoalkyl silicone primed steel panel as well as the unprimed steel panel were then dip-coated and allowed to air dry for 1 hour at 25° C. They were then placed in a 150° C. air circulating oven. After 22 minutes the panels were removed from the oven and it was observed that: (a) the vinyl coating on the unprimed steel panel was jet black, and (b) the vinyl coating on the aminoalkyl silicone primed steel panel was absolutely colorless.

With these specimens it was also discovered that: (a) the black vinyl coating on the uncoated steel panel was readily removed from the steel by merely scraping the resin with a knife blade. The resin was black, brittle, and had decomposed. The exposed steel underneath the resin had corroded and was now yellowish-brown in appearance; (b) the vinyl coating over the aminoalkyl silicone primed panel was tightly adherent to the steel. Some resin was removed with a knife edge and it was found colorless, flexible, and it had not decomposed. The exposed steel was bright and shiny and did not appear to have corroded.

This example clearly shows the aminoalkyl silicone coating functions as a color stabilizer, corrosion inhibitor, and bonding agent for "Vinylite" copolymer to steel.

EXAMPLE V

*"Vinylite" Copolymers (VYHH) on Copper*

Two 5 mil copper foil panels were prepared in the following manner: Momentary acid dip in 18 percent HCl, wash with water, scour with an alkaline cleanser, and dry. One panel was completely immersed in 5 percent gamma-aminopropylsilicone in ethanol. It was allowed to air dry, then oven dried 5 minutes at 150° C. Both panels were then completely immersed in the 20 percent "Vinylite" solution described in Example IV. The panels were allowed to air dry 1 hour then placed in a 150° C. air circulating oven. After 20 hours the vinyl coated panels were removed from the oven. It was observed that: (a) from the unprimed copper panel the resin coating could readily be removed with a thumbnail. This panel failed a ⅛ inch mandrel bend, and (b) similar scratching of the aminoalkyl silicone primed copper panel could not remove the resin coating. This panel passed a ⅛ inch mandrel bend.

EXAMPLE VI

*Vinyl Terpolymer*

Two 1½ x 6 inch steel panels were prepared exactly as in Example IV. One panel was dip-coated in 5 percent copolymer of delta-aminobutylsilicone-phenylsilicone in ethanol, and the coating was air dried. It was then placed in a 150° C. oven for 5 minutes. A 20 percent "Vinylite" terpolymer solution was prepared by jar rolling the following mixture until it was completely compatible: 200 grams toluene, 200 grams methyl isobutyl ketone, and 100 grams "Vinylite" VAGH (consisting of 91 percent vinyl chloride, 3 percent vinyl acetate, 6 percent vinyl alcohol). Then both the primed and unprimed steel panels were dip-coated into this solution. The panels were air dried until they were tack-free. Then they were placed in a 150° C. air circulating oven. After 1 hour at 150° C. they were removed from the oven and it was observed that: (a) the unprimed steel panel was jet black. When this panel was subjected to 75-inch pounds on the Gardner impact tester, the resin coating "crazed" and flaked off, and (b) the aminoalkyl silicone primed steel panel was still essentially colorless although there were a few light brown areas. This panel successfully passed the limiting 80-inch pound impact test. This example clearly indicates "Vinylite" terpolymers have their bond strength to metal improved and their color stabilized to darkening at elevated temperatures by the use of an aminoalkyl silicone undercoating on the metal.

EXAMPLE VII

*"Vinylite" Homopolymer-Steel*

Two 1½ x 6 inch mild steel panels were scoured with an alkaline cleanser. These panels were washed and then dried. One panel was dipped in 30 percent deltaaminobutylmethylsilicone-phenylsilicone coplymer in ethanol and air dried. This panel was cured 10 minutes at 150° C. Both panels were coated by a knife-edge technique with a plastisol of polyvinylchloride which was prepared by ball milling 100 parts of "Vinylite" QYNV homopolymer and 60 parts of didecylsebacate. The plastisol was then fused by placing the panels in a 175° C. oven for 10 minutes. Both panels were then post-cured 3 hours at 100° C. After 48 hours of this post-cure treatment, it was observed that the iron on the unprimed panel darkened in appearance and had corroded. The "Vinylite" on the primed panel did not corrode the panel. Using the Thwing-Albert physical tester, the following peel strength values were observed: (a) "Vinylite" on unprimed panel—nil pounds per inch strip, and (b) "Vinylite" on silicone primed panel—2 pounds per inch strip.

This example clearly shows how an aminoalkyl silicone coating on steel results in a bonding of "Vinylite" to steel and prevents the corrosion of steel when contacted with polyvinylchloride under standard fusing conditions. Table II lists various other metals to which "Vinylite" was bonded by an aminoalkylsilicone compound. The test procedures used were substantially the same as described in Examples IV to VII. Since the literature states that "Vinylite" discolors badly at elevated temperatures in the presence of steel zinc, brass, and tin plate, only these metals were fully evaluated.

TABLE II.—USE OF AMINOALKYL SILICONE PRIME COATINGS ON METALS THAT ARE OVERCOATED WITH VINYL CHLORIDE RESINS

| Aminoalkyl silicone | Copper | Steel | Zinc | Brass | Tin plate |
|---|---|---|---|---|---|
| Monomers: | | | | | |
| $NH_2(CH_2)_3Si(OEt)_3$ | | X-2 | | | |
| $HN[(CH_2)_3Si(OEt)_3]_2$ | | X-2 | | | |
| Polymers: | | | | | |
| $NH_2(CH_2)_3SiO_{3/2}$ | X-2 (Ex. V) | X-2 (Ex. IV) | X-2 | X-2 | X-2 |
| $NH_2(CH_2)_4SiO_{3/2}$ | | X-2 | | | |
| $[NH_2(CH_2)_4SiMeO]_x$ | | X-2 | | | |
| $HN[(CH_2)_3SiO_{3/2}]_2$ | | X-2 | | | |
| Copolymers: | | | | | |
| $\phi SiO_{3/2} \cdot NH_2(CH_2)_3SiO_{3/2}$ | | X-3 | | | |
| $\phi SiO_{3/2} \cdot NH_2(CH_2)_4SiO_{3/2}$ | | X-2 | X-2 | X-2 | X-2 |
| $\phi SiO_{3/2} \cdot NH_2(CH_2)_4SiMeO$ | | X-3 | | | |
| $Me_2SiO \cdot NH_2(CH_2)_4SiMeO$ | | X-2 | | | |

NOTE.—X=aminosilicone undercoating used on metal and found to be effective in preventing darkening of resin at 150° C. per one-half hour. 2=VYHH—20% of (87% vinyl chloride, 13% vinyl acetate copolymer) in 50:50 toluene-methylisobutyl ketone solution. 3=VAGH—20% of (91% vinyl chloride, 3% vinyl acetate, 6% vinyl alcohol terpolymer) in 50:50 toluene-methylisobutyl ketone solution.

The following lists the time improvement in color retention using a gamma-aminopropylsilicone undercoat of about 0.02–0.04 mil in conjunction with "Vinylite" VYHH copolymers.

| Base metal | Time required for "Vinylite" copolymer on metal to turn black | |
|---|---|---|
| | Unprimed metal, min. | Primed metal, hours |
| Iron | 15 | >4 |
| Zinc | 5 | >4 |
| Brass | 5 | >4 |
| Tin plate | 15 | >2 |

(2) *Silicones.*—Silicone resins coated on copper flats or wire when exposed to elevated temperatures (250°–275° C.) do not stay bonded to the copper substrate. The silicone resin will peel away from the metal after about 75 hours at 275° C. However, by putting a 0.02–0.04 mil undercoating of aminoalkyl silicone compound on the copper metal, it has been found that the silicone resin stays bonded to the metal for over 1000 hours at 275° C.

EXAMPLE VIII

Two copper panels (1½ x 6 inches) were cleaned by the following technique. The panels were momentarily dipped in 18 percent HCl, flushed with water, then scoured with an alkaline cleanser such as "Old Dutch Cleanser." After washing, they were dipped in acetone and dried. One panel was completely immersed in 5 percent gamma-aminopropylsilicone in ethanol, and then allowed to air dry for 24 hours. Both the primed and unprimed panels were then dip-coated in 50 percent silicone electrical varnish in toluene solution. The resin was comprised of 1.50 organic radicals per silicon atom and 0.45 phenyl unit per methyl unit. These panels were cured by (a) letting them drain dry, (b) heating them 2 hours at 150° C., and (c) heating them 16 hours at 200° C. These panels were then placed in a 275° C. air circulating oven for 100 hours, and when removed, it was observed that:

(a) For the unprimed panel, the copper was darkly colored and the silicone resin had broken away from the copper metal. The resin could be completely stripped of the copper with the thumbnail; and
(b) For the primed panel, the silicone resin showed the bright copper metal and was tightly bonded to the metal. The resin could not be removed from the copper panel by thumbnail.

This primed panel was placed back in the 275° C. air circulating oven for an additional 900 hours. The panel was removed and the following was observed: the copper metal was still reasonably bright beneath the surface of the resin. The resin film could not be removed by thumbnail even after scoring the resin surface with a scribe. This example conclusively establishes the utility of aminoalkyl silicone undercoatings to give improved bond strength for silicone overcoats to copper metal.

In an identical manner, the following aminoalkyl silicone compounds were tested as undercoatings for silicone overcoats on copper:

a. 5% $NH_2(CH_2)_3Si(OEt)_3$ in ethanol
b. 5% copolymer of $NH_2(CH_2)_3SiO_{3/2}+\phi SiO_{3/2}$ in ethanol
c. 5% $NH_2(CH_2)_4SiO_{3/2}$ in ethanol
d. 5% $[NH_2(CH_2)_4SiMeO]_x$ in ethanol
e. 5% copolymer of $NH_2(CH_2)_4SiO_{3/2}+\phi SiO_{3/2}$ in ethanol In all instances the unprimed copper surface lost its bond with the resin overcoat within 100 hours. The primed copper portion had 100 percent bond retention of resin overcoat to metal under these condition.

The following color changes were also observed, but these phenomena were without affect on the adhesion of this silicone varnish to the primed metal surface: (a) The $NH_2(CH_2)_3SiO_{3/2}$ and the $NH_2(CH_2)_4SiO_{3/2}$ prime coats enabled the copper to retain its brilliant luster during the heat aging tests. (b) In the cases of $NH_2(CH_2)_3Si(OEt)_3$, the $[NH_2(CH_2)_4SiMeO]$ polymer and all the copolymers tested as prime coats, the copper darkened slightly in color. This change in copper appearance did not have any affect on the adhesion of the overcoated silicone resin to the copper. In a test period of 1000 hours at 275° C. for the following prime coats; $NH_2(CH_2)_3Si(OEt)_3$, $NH_2(CH_2)_3SiO_{3/2}$, and copolymer of $NH_2(CH_2)_3SiO_{3/2}$, and $\phi SiO_{3/2}$, no loss in adhesion was found, even though there was some darkening of the copper for the monomer and copolymer tested.

Gamma-aminopropylsilicone prime coat on steel was also overcoated with this silicone. After 120 hours at 275° C. and using a knife edge, the resin was scraped from the unprimed metal and underfilm oxidation was seen. However, a bright metal surface was exposed when the resin film was scraped away from the primed steel panel. This means the aminoalkyl silicon compound prevented underfilm corrosion.

(3) *Acrylates.*—Pigmented acrylate resins are used as decorative and protective films for automobiles. Acrylates have poor adhesion to metals. Two aminosilicone compounds were tested and found to improve the bond strength of the acrylate resin to the metal substrates.

EXAMPLE IX

Two steel panels (1½ x 6 inches) were cleaned; they were scrubbed with an alkaline cleanser, washed, dipped in acetone, then allowed to air dry. One panel was then dip-coated in 5 percent gamma-aminopropylsilicone in ethanol and allowed to air dry. The panel was then cured 15 minutes at 150° C. Both panels were then dipped in a 40 percent polyethylmethacrylate in toluene. The panel was allowed to air dry 1½ hours. The panel was then baked 80 minutes at 150° C. Adhesion was then tested by subjecting the panels to the Gardner impact tester. It was found that: (*a*) the unprimed acrylate coated panel failed a 2-inch pound impact, and (*b*) the aminopropyl primed painted panel passed a 20-inch pound impact. This example clearly shows that an aminoalkyl silicone undercoating improves the adhesion of this organic resin to steel.

In a similar manner aluminum and copper metals were tested with this polymer and its phenylsilicone copolymer. The results are listed in Table III. Improvements in bond strengths were obtained for the three metals tested.

mer solution in ethanol. The solution was air dried and then heat cured 5 minutes at 150° C. Both panels were then completely dipped in the epoxy silicone resin prepared as described above. The panels were allowed to air dry, were cured 2 hours at 150° C., and then cured for 1 hour at 200° C. Each panel was scored with a steel scribe and then placed in a 70° C. 100 percent relative humidity chamber for 36 hours' exposure. After this period the panels were examined. The unprimed steel panel showed gross corrosion along the edges of the panel. Also there was a large amount of corrosion along the scribe mark. On the other hand, the aminoalkyl silicon primed panel showed reduced corrosion both along the edges of the panel and along the scribe mark when compared with the unprimed panel. This experiment shows the aminoalkyl coating improves corrosion resistance of epoxy resin systems. Similar improvements were obtained using the following commercially available epoxy resin systems: Amercoat 50 (epoxy resins), Borthig K-3829 (phenolic modified epoxy resins), Sterling T-653-LB (epoxy resin).

EXAMPLE XI

Following the procedure of Example IV, three 1½ x 6 inch mild steel panels were scoured with an alkaline cleanser and then washed and dried. One of the panels was dip-coated in an ethanol-water solution containing five (5) percent by weight of N-beta-aminoethyl-gamma-aminoisobutylmethyldiethoxysilane and a second panel dip-coated in an ethanol-water solution containing five TABLE III.—AMINOALKYL SILICONE COMPOUNDS AS BONDING AGENTS FOR ADHESION OF POLYETHYLMETHACRYLATE TO METAL

| Silicone compound used as metal prime coating | Gardner impact test results in inch pounds | | | |
|---|---|---|---|---|
| | Metal | Unsized metal | Primed metal | |
| $NH_2(CH_2)_3SiO_{3/2}$ | Steel | 2-inch pound fail | 20-inch pound pass | 50-inch pound fail |
| | Aluminum | 8-inch pound fail | 10-inch pound pass | 20-inch pound fail |
| | Copper | do | 18-inch pound pass | Do. |
| Copolymer of $NH_2(CH_2)_4SiO_{3/2}\phi SiO_{3/2}$ | Steel | 2-inch pound fail | 10-inch pound pass | Do. |
| | Aluminum | 8-inch pound fail | do | 30-inch pound fail |

NOTE.—Primed and unprimed panels were dip-coated with 40 percent polyethylmethacrylate, allowed to drain dry, and then baked 1½ hours at 150° C. Panels then tested on Gardner impact tester. A pass indicates adhesion of paint to metal is not lost after impact. A fail indicates the impact has resulted in loss of adhesion.

Similar studies using nitrocellulose lacquer (Duco lacquer No. 1234 unpigmented lacquer) were also made and it was found that an aminoalkyl silicone prime coating provides a bond for either an air-dried or oven-baked overcoat to steel, aluminum, or copper substrates.

(4) *Epoxy resins.*—An epoxysilicone was prepared as follows: A mixture of 60 mole percent $\phi Si(OEt)_3$, 20 mole percent $Me_2Si(OEt)_2$, and 20 mole percent $\phi Si(OEt)_2$ was dissolved in solvent, and sufficient water was added to hydrolyze (OEt) groups so that the resultant solvent free resin has 20 percent residual ethoxy content. Using the desolvated resin so prepared, exactly 0.855 mole of resorcinol was added for each (OEt) equivalent. This was heated to 195–205° C. to remove alcohol. When 90–95 percent theoretical alcohol was removed, the product was cooled. One (1) OH equivalent of polymer so prepared was hot blended with 1 equivalent of the diglycidyl ether of Bisphenol A,

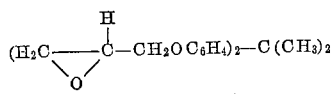

Dilute the above hot blend to 50 percent solids in a 50:50 mixture of isophorone-toluene solvents. Add 0.1 percent piperidine catalyst on a solids basis.

EXAMPLE X

Two mild steel panels, 1½ x 6 inches, were cleaned by scouring with an alkaline cleanser, flushed with water, and then dried. One panel was completely immersed in a 5 percent gamma-aminopropyl-phenylsilicone copoly- (5) percent by weight of N-gamma-aminopropyl-gamma-aminopropyltriethoxysilane. Both treated panels were then dried in an oven maintained at a temperature of 150° C. for a period of five (5) minutes. A twenty (20) percent vinyl resin solution (same as employed in Example IV) was prepared and the treated panels as well as the untreated panel dip-coated therewith. The vinyl resin coated panels were then air dried for one (1) hour at room temperature and subsequently placed in an air circulating oven maintained at a temperature of 150° C. After one-half hour the three panels were removed from the oven and it was observed that: (*a*) the vinyl resin coating on the unprimed steel panel was jet black, and (*b*) the vinyl resin coating on the aminoalkyl silicon treated panels were colorless.

The present application is a continuation-in-part application of my pending United States application Ser. No. 674,053, filed July 25, 1957, now abandoned.

What is claimed is:

1. Process of forming a composite article, which comprises applying to a metal surface a thin film of an aminoalkyl silicon compound containing the group:

$$(>N-R-Si\equiv)$$

wherein R is a divalent saturated aliphatic or saturated or unsaturated cyclic hydrocarbon radical having a chain of at least three carbons and wherein nitrogen is attached to at least a third carbon removed from silicon, wherein each of the free bonds of the nitrogen atom is bonded to a member of the class consisting of hydrogen, hydrocarbyl, aminoalkyl and $[-(CH_2)_aSi\equiv]$, wherein (a) is an integer of at least three and wherein at least one free bond of silicon is attached to a group from the class of alkyl and silicon through Si—O bonds and the remaining free bonds of silicon are attached to hydrocarbyl, and said metal substrate being selected from the group consisting of the metals lying below and including magnesium in the electromotive series and alloys thereof, and then applying a coating of an organic polymeric material to said metal surface over said film.

2. A process as defined in claim 1, wherein said thin film has a thickness of from 0.01 to 0.10 mil.

3. A process of forming a composite article, which comprises applying to a metal substrate a thin film of an aminoalkyl silicon compound containing the aminoalkylsilyl group:

$$(>N—R—Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—$(CH_2)_a$Si$\equiv$], wherein (a) is an integer of at least 3 and wherein at least one free bond of silicon is attached to a group from the class of alkyl and silicon through Si—O bonds and the remaining free bonds of silicon are attached to hydrocarbyl, and then applying a coating of a thermo setting synthetic organic resin to said metal substrate over said film, said metal substrate being selected from the group consisting of the metals lying below and including magnesium in the electromotive series and alloys thereof.

4. A process of forming a composite article which comprises applying to a metal substrate a thin film of an aminoalkyl silicon compound containing the aminoalkylsilyl group:

$$(>N—R—Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—$(CH_2)_a$Si$\equiv$], wherein (a) is an integer of at least 3 and wherein at least one free bond of silicon is attached to a group from the class of alkyl and silicon through Si—O bonds and the remaining free bonds of silicon are attached to hydrocarbyl, and then applying a coating of a thermoplastic synthetic organic resin to said metal substrate over said film, said metal substrate being selected from the group consisting of the metals lying below and including magnesium in the electromotive series and alloys thereof.

5. A process of forming a composite article, which comprises applying to a metal substrate a thin film of an aminoalkyl silicon compound containing the aminoalkylsilyl group:

$$(>N—R—Si\equiv)$$

wherein R is divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—$(CH_2)_a$Si$\equiv$], wherein (a) is an integer of at least 3, and wherein at least one free bond of silicon is attached to a group from the class of alkyl and silicon through Si—O bonds and the remaining free bonds of silicon are attached to hydrocarbyl, and then applying a coating of a synthetic elastomeric organic material to said metal substrate over said film, said metal substrate being selected from the group consisting of the metals lying below and including magnesium in the electromotive series and alloys thereof.

6. A process of forming a composite article, which comprises applying to a metal substrate a thin film of an aminoalkyl silicon compound containing the aminoalkylsilyl group:

$$(>N—R—Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atoms is bonded to a member from the class consisting of hydrogen, hydrocarbyl, aminoalkyl and [—$(CH_2)_a$Si$\equiv$], wherein (a) is an integer of at least 3, and wherein at least one free bond of silicon is attached to a group from the class of alkyl and silicon through Si—O bonds and the remaining free bonds of silicon are attached to hydrocarbyl, and then applying a coating of a curable polysiloxane to said metal substrate over said film said metal substrate being selected from the group consisting of the metals lying below and including magnesium in the electromotive series and alloys thereof.

7. A process of forming a composite article, which comprises applying to a metal substrate a thin film of an aminoalkyl silicon compound containing the group:

$$(>N—R—Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—$(CH_2)_a$Si$\equiv$], wherein (a) is an integer of at least 3 and wherein at least one free bond of silicon is attached to a group from the class of alkyl and silicon through Si—O bonds and the remaining free bonds of silicon are attached to hydrocarbyl, said metal substrates being selected from the group consisting of the metals lying below and including magnesium in the electromotive series and alloys thereof, and then applying a coating of a methyl-phenyl silicone varnish to said metal substrate over said film.

8. A process of forming a composite article, which comprises applying to a metal substrate a thin film of an aminoalkyl silicon compound containing the group:

$$(>N—R—Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—$(CH_2)_a$Si$\equiv$], wherein (a) is an integer of at least 3 and wherein at least one free bond of silicon is attached to a group from the class of alkyl and silicon through Si—O bonds and the remaining free bonds of silicon are attached to hydrocarbyl, and said metal substrate being selected from the group consisting of the metals lying below and including magnesium in the electromotive series and alloys thereof, and then applying a coating of curable silicone elastomer compound to said metal substrate over said film, and thereafter curing said compound to form an elastomeric coating bonded to said substrate.

9. A process of forming a composite article, which comprises applying to a metal substrate a thin film of an aminoalkyl silicon compound containing the group:

$$(>N—R—Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—($CH_2$)$_a$Si≡], wherein (a) is an integer of at least 3 and wherein at least one free bond of silicon is attached to a group from the class of alkyl and silicon through Si—O bonds and the remaining free bonds of silicon are attached to hydrocarbyl, and said substrate being selected from the group consisting of the metals lying below and including magnesium in the electromotive series and alloys thereof, and then applying a coating of a curable, silica-filled dimethyl silicone gum stock modified by vinyl-alkyl silicone to said metal substrate over said film, and thereafter curing said gum stock to form an elastomeric coating bonded to said substrate.

10. A process of forming a composite article, which comprises applying to a metal substrate a thin film of an aminoalkyl silicon compound containing the group:

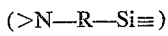

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—($CH_2$)$_a$Si≡], wherein (a) is an integer of at least 3 and wherein at least one free bond of silicon is attached to a group from the class of alkyl and silicon through Si—O bonds and the remaining free bonds of silicon are attached to hydrocarbyl, and said substrate being selected from the group consisting of the metals lying below and including magnesium in the electromotive series and alloys, thereof, and then applying a coating of polysiloxane that can be cured to form a resin to said metal substrate over said film, and thereafter curing the same polysiloxane to form a resin coating bonded to said substrate.

11. A process of forming a composite article, which comprises applying to a metal substrate a thin film of an aminoalkyl silicon compound containing the group:

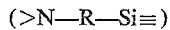

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—($CH_2$)$_a$Si≡], wherein (a) is an integer of at least 3 and wherein at least one free bond of silicon is attached to a group from the class of alkyl and silicon through Si—O bonds and the remaining free bonds of silicon are attached to hydrocarbyl, and said substrate being selected from the group consisting of the metals lying below and including magnesium in the electromotive series and alloys thereof, and then applying a coating of a curable neoprene elastomer compound to said metal substrate over said film, and thereafter curing said compound to form an elastomeric coating bonded to said substrate.

12. A process of forming a composite article, which comprises applying to a metal substrate a thin film of an aminoalkyl silicon compound containing the group:

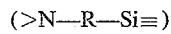

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—($CH_2$)$_a$Si≡] wherein (a) is an integer of at least 3 and wherein at least one free bond of silicon is attached to a group from the class of alkyl and silicon through Si—O bonds and the remaining free bonds of silicon are attached to hydrocarbyl, and said substrate being selected from the group consisting of the metals lying below and including magnesium in the electromotive series and alloys thereof, and then applying a solution of vinyl chloride-vinyl acetate copolymer to said metal substrate over said film, and thereafter drying said solution to form a coating of said copolymer bonded to said substrate.

13. A process of forming a composite article, which comprises applying to a metal substrate a thin film of an aminoalkyl silicon compound containing the group:

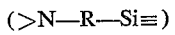

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—($CH_2$)$_a$Si≡], wherein (a) is an integer of at least 3 and wherein at least one free bond of silicon is attached to a group from the class of alkyl and silicon through Si—O bonds and the remaining free bonds of silicon are attached to hydrocarbyl, and said substrate being selected from the group consisting of the metals lying below and including magnesium in the electromotive series and alloys thereof, and then applying a solution of a vinyl-chloride-vinyl-acetate-vinyl alcohol terpolymer to said metal substrate over said film, and thereafter drying said solution to form a coating of said terpolymer bonded to said substrate.

14. A process of forming a composite article, which comprises applying to a metal substrate a thin film of an aminoalkyl silicon compound containing the group:

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—($CH_2$)$_a$Si≡], wherein (a) is an integer of at least 3 and wherein at least one free bond of silicon is attached to a group from the class of alkyl and silicon through Si—O bonds and the remaining free bonds of silicon are attached to hydrocarbyl, and said substrate being selected from the group consisting of the metals lying below and including magnesium in the electromotive series and alloys thereof, and then applying a coating of polyvinylchloride plastisol to said metal substrate over said film and thereafter curing said plastisol to form a coating bonded to said substrate.

15. A process of forming a composite article, which comprises applying to a metal substrate a thin film of an aminoalkyl silicon compound containing the group:

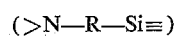

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and [—($CH_2$)$_a$Si≡], wherein (a) is an integer of at least 3 and wherein at least one free bond of silicon is attached to a group from the class of alkyl and silicon through Si—O bonds and the remaining free bonds of silicon are attached to hydrocarbyl, and said substrate being selected from the group consisting of the metals lying below and including magnesium in the electromotive series and alloys thereof, and then applying a polyethylmethacrylate solution to said metal substrate of said film, and thereafter drying said polyethylmethacrylate to form a bonded coating on said substrate.

16. A process of forming a composite article, which comprises applying to a copper substrate a thin film of an aminoalkyl silicon compound containing the group:

$$(>N-R-Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and $[-(CH_2)_aSi\equiv]$, wherein $(a)$ is an integer of at least 3 and wherein at least one free bond of silicon is attached to a group from the class of alkyl and silicon through Si—O bonds and the remaining free bonds of silicon are attached to hydrocarbyl, and then applying a coating of an organic polymeric material to said copper substrate over said film.

17. A process of forming a composite article, which comprises applying to an aluminum substrate a thin film of an aminoalkyl silicon compound containing the group:

$$(>N-R-Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and $[-(CH_2)_aSi\equiv]$, wherein $(a)$ is an integer of at least 3 and wherein at least one free bond of silicon is attached to a group from the class of alkyl and silicon through Si—O bonds and the remaining free bonds of silicon are attached to hydrocarbyl, and then applying a coating of an organic polymeric material to said aluminum substrate over said film.

18. A process of forming a composite article, which comprises applying to a steel substrate a thin film of an aminoalkyl silicon compound containing the group:

$$(>N-R-Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and $[-(CH_2)_aSi\equiv]$, wherein $(a)$ is an integer of at least 3 and wherein at least one free bond of silicon is attached to a group from the class of alkyl and silicon through Si—O bonds and the remaining free bonds of silicon are attached to hydrocarbyl, and then applying a coating of an organic polymeric material to said steel substrate over said film.

19. A process of forming a composite article, which comprises applying to a silver substrate a thin film of an aminoalkyl silicon compound containing the group:

$$(>N-R-Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and $[-(CH_2)_aSi\equiv]$, wherein $(a)$ is an integer of at least 3 and wherein at least one free bond of silicon is attached to a group from the class of alkyl and silicon through Si—O bonds and the remaining free bonds of silicon are attached to hydrocarbyl, and then applying a coating of an organic polymeric material to said silver substrate over said film.

20. A process of forming a composite article, which comprises applying to a tin substrate a thin film of an aminoalkyl silicon compound containing the group:

$$(>N-R-Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and $[-(CH_2)_aSi\equiv]$, wherein $(a)$ is an integer of at least 3 and wherein at least one free bond of silicon is attached to a group from the class of alkyl and silicon through Si—O bonds and the remaining free bonds of silicon are attached to hydrocarbyl, and then applying a coating of an organic polymeric material to said tin substrate over said film.

21. A process of forming a composite article, which comprises applying to a brass substrate a thin film of an aminoalkyl silicon compound containing the group:

$$(>N-R-Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of nitrogen atom is bonded to a member from the class consisting of hydrogen, hydrocarbyl, aminoalkyl and $[-(CH_2)_aSi\equiv]$, wherein $(a)$ is an integer of at least 3 and wherein at least one free bond of silicon is attached to a group from the class of alkyl and silicon through Si—O bonds and the remaining free bonds of silicon are attached to hydrocarbyl, and then applying a coating of an organic polymeric material to said brass substrate over said film.

22. A composite article comprising a metal substrate selected from the group consisting of the metals lying below and including magnesium in the electromotive series and alloys thereof, a prime coating of an aminoalkyl silicon compound, and an outer coating of an organic polymeric material bonded to said substrate through said prime coating, said aminoalkyl silicon compound containing the following grouping:

$$(>N-R-Si\equiv)$$

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, aminoalkyl and $[-(CH_2)_aSi\equiv]$, wherein $(a)$ is an integer of at least 3 and wherein at least one free bond of silicon is attached to a group from the class of alkyl and silicon through Si—O bonds and the remaining free bonds of silicon are attached to hydrocarbyl.

23. An article as defined in claim 22, wherein said prime coating has a thickness of from 0.01 to 0.10 mil.

24. A composite article as defined in claim 22, wherein said metal substrate is a member selected from the class consisting of copper, aluminum, steel, tin, silver, and brass.

25. A composite article comprising a metal substrate selected from the group consisting of the metals lying below and including magnesium in the electromotive series and alloys thereof, a prime coating of an aminoalkyl silicon compound, and an outer coating of an organic polymeric material bonded to said substrate through said prime coating, said aminoalkyl silicon compound having the following formula:

$$[H_2N-R-]_d\underset{\underset{R''_b}{|}}{Si}X_{[4-(d+b)]}$$

wherein R is a divalent saturated aliphatic or saturated or unsaturated cyclic hydrocarbon radical having a chain of at least 3 carbons and wherein nitrogen is attached to at least a third carbon removed from silicon, R'' represents a hydrocarbon group selected from the class consisting of methyl, ethyl, propyl, butyl, phenyl, naphthyl, tolyl, X represents an alkoxy group selected from the class consisting of methoxy, ethoxy, and propoxy, and (b) is an integer having a value of from 0 to 2, (d) is an integer having a value of from 1 to 2, and the sum of (d+b) is not greater than 3.

26. A composite article comprising a metal substrate selected from the group consisting of the metals lying below and including magnesium in the electromotive series and alloys thereof, a prime coating of an aminoalkyl silicon compound, and an outer coating of an organic polymeric material bonded to said substrate through said prime coating, said aminoalkyl silicon compound containing the unit:

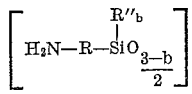

wherein R is a divalent saturated aliphatic or saturated or unsaturated cyclic hydrocarbon radical having a chain of at least 3 carbons and wherein nitrogen is attached to at least a third carbon removed from silicon, R'' represents a hydrocarbon group selected from the class consisting of methyl, ethyl, propyl, butyl, phenyl, naphthyl and tolyl, and (b) is an integer having a value of from 0 to 2.

27. A composite article comprising a metal substrate selected from the group consisting of the metals lying below and including magnesium in the electromotive series and alloys thereof, a prime coating of an aminoalkyl silicon compound, and an outer coating of an organic polymeric material bonded to said substrate through said prime coating, said aminoalkyl silicon compound containing the following structural units:

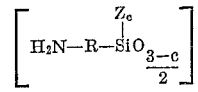

wherein R is a divalent saturated aliphatic or saturated or unsaturated cyclic hydrocarbon radical having a chain of at least 3 carbons and wherein nitrogen is attached to at least a third carbon removed from silicon, Z represents a member selected from the group consisting of hydroxyl and alkoxy radicals, and (c) has an average value of from 0 to 2.

28. A composite article comprising a metal substrate selected from the group consisting of the metals lying below and including magnesium in the electromotive series and alloys thereof, a prime coating of a copolymeric aminoalkylpolysiloxane, and an outer coating of an organic polymeric material bonded to said substrate through said prime coating, said copolymeric aminoalkylpolysiloxane containing the following structural units:

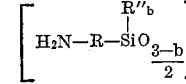

and

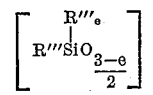

wherein R is a divalent saturated aliphatic or saturated or unsaturated cyclic hydrocarbon radical having a chain of at least 3 carbons and wherein nitrogen is attached to at least a third carbon removed from silicon, R'' represents a hydrocarbon group selected from the class consisting of methyl, ethyl, propyl, butyl, phenyl, naphthyl and tolyl, the R''' represents a hydrocarbon group selected from the class consisting of methyl, ethyl, propyl, butyl, phenyl, naphthyl, tolyl, vinyl and cyclohexenyl, (b) is an integer having a value of from 0 to 2, and (e) is an integer having a value of from 0 to 2.

29. A composite article comprising a copper substrate, a prime coating of gamma aminopropylpolysiloxane, and an outer coating of vinyl plastisol resin cured on said substrate and bonded thereto through said prime coating.

30. A composite article comprising a copper substrate, a prime coating of a N-aminoalkyl-gamma-aminopropylpolysiloxane silane and an outer coating of a cured silicone elastomeric coating bonded to said substrate through said prime coating.

31. A composite article comprising a copper substrate, a prime coating of gamma-aminopropylpolysiloxane, and an outer coating of a cured silicone elastomeric coating bonded to said substrate through said prime coating.

32. A composite article comprising an aluminum substrate, a prime coating of a gamma-aminopropylpolysiloxane and an outer coating of a cured vinyl plastisol resin coating bonded to said substrate through said prime coating.

33. A composite article comprising a metal foil substrate, a prime coating of gamma-aminopropylpolysiloxane and an outer coating of a cured neoprene elastomeric coating bonded to said substrate through said prime coating.

34. A composite article comprising a steel substrate, a prime coating of silicone containing N-aminoalkyl-gamma-aminoalkyl siloxane units, and an outer coating of vinylchloride-vinylacetate-vinylalcohol terpolymer on said substrate and bonded thereto through said prime coating.

35. A composite article comprising a steel substrate, a prime coating of a gamma-aminopropylpolysiloxane, and an outer coating of a vinylchloride-vinylacetate copolymer on said substrate and bonded thereto through said prime coating.

36. A composite article comprising a steel substrate, a prime coating of a N-aminoalkyl-gamma-aminoalkylpolysiloxane, and an outer coating of a vinylchloride-vinylacetate copolymer on said substrate and bonded thereto through said prime coating.

37. A composite article comprising a copper substrate, a prime coating of a gamma-aminopropylpolysiloxane, and an outer coating of polyethyl-methacrylate cured on said substrate and bonded thereto through said prime coating.

References Cited in the file of this patent

UNITED STATES PATENTS

| | | |
|---|---|---|
| 2,721,856 | Sommer | Oct. 25, 1955 |
| 2,754,311 | Elliott | July 10, 1956 |
| 2,754,312 | Elliott | July 10, 1956 |
| 2,762,823 | Speier | Sept. 11, 1956 |
| 2,832,754 | Jex | Apr. 29, 1958 |
| 2,902,389 | Keil | Sept. 1, 1959 |
| 2,919,173 | Roff | Dec. 29, 1959 |